April 18, 1961 E. A. HAASE ET AL 2,979,895
PRESSURE RATIO COMPUTER
Filed March 29, 1956 4 Sheets-Sheet 1

INVENTORS
ELMER A. HAASE.
WAYNE E. WERTS.
BY Cecil J Arens
ATTORNEY.

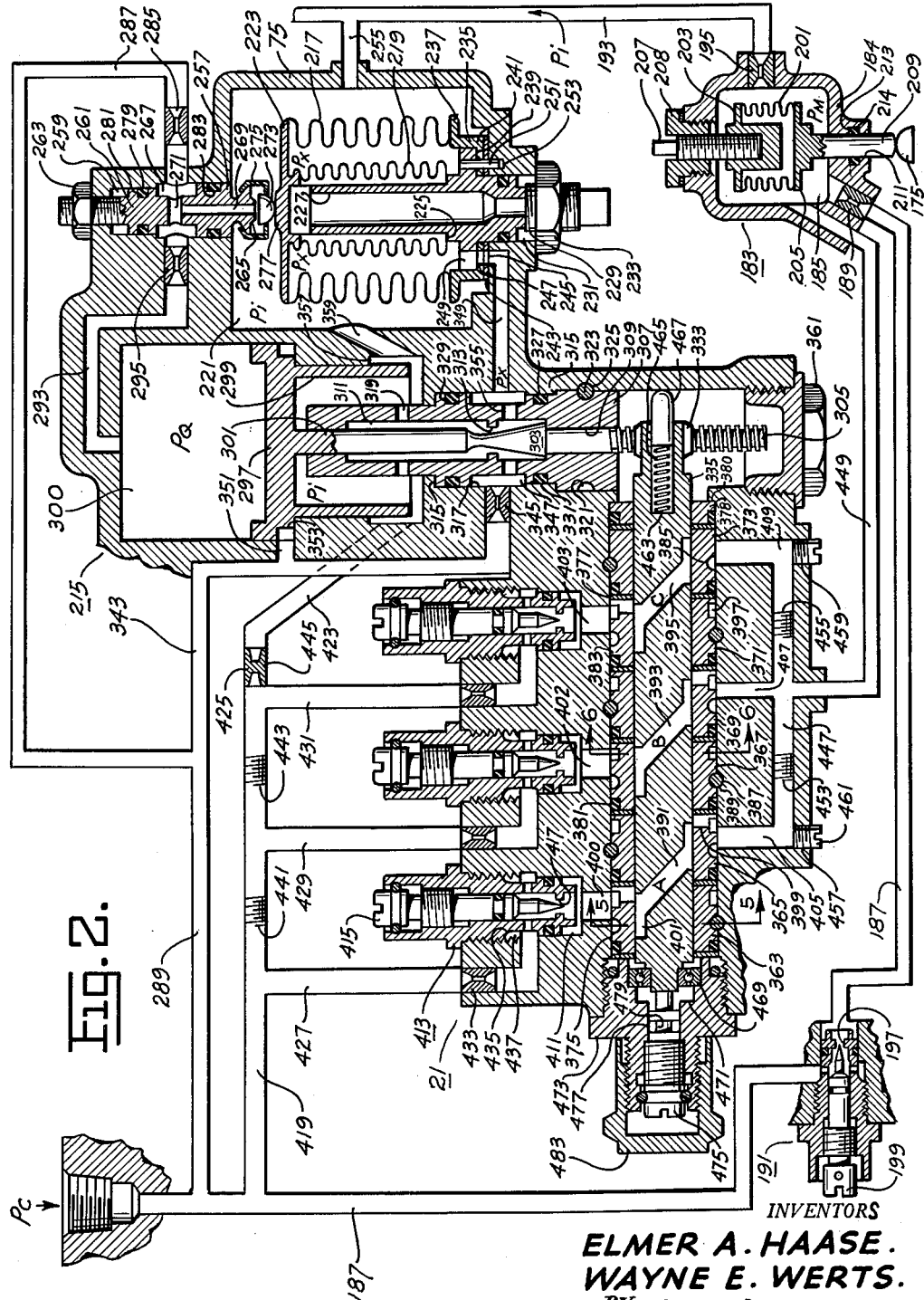

INVENTORS
ELMER A. HAASE.
WAYNE E. WERTS.
BY Cecil J Arens
ATTORNEY.

United States Patent Office 2,979,895
Patented Apr. 18, 1961

2,979,895

PRESSURE RATIO COMPUTER

Elmer A. Haase and Wayne E. Werts, South Bend, Ind., assignors to The Bendix Corporation, a corporation of Delaware Filed Mar. 29, 1956, Ser. No. 574,691

14 Claims. (Cl. 60—39.28)

This invention relates to aircraft engine fuel metering systems and more particularly to a device for controlling the fuel flow to a gas turbine engine so that optimum engine acceleration may be obtained throughout the speed range of the engine.

When a gas turbine engine is accelerated it is not only important that sufficient fuel shall be permitted to reach the engine, but it is also of importance that the quantity that can reach it does not exceed certain limits. If the fuel supply exceeds what is necessary to achieve the desired acceleration, the result may be that the engine will suffer damage from overheating and that the air compressor may be subjected to surging or stalling.

In many present day high compression, high efficiency gas turbine engines, it has been found that the stall or surge characteristic of the engine compressor requires limiting the fuel flow supplied to the engine throughout the greater part of the range of acceleration. Many of the fuel controls now in use on such engines include a mechanism which schedules the fuel flow during acceleration such that the compressor stall region for the particular engine is avoided. Experience in this art, however, has been such that in order to avoid the compressor stall region during engine acceleration by means of a relatively simple control system, a substantial safety margin must be provided which necessarily decreases the rate at which the engine can be accelerated, particularly since the compressor stall region varies over a relatively wide range with variations in engine operating coditions. On the other hand, controls have been designed which may more closely meet the compressor limitations, but which are of such inherent complexity as to make them impractical for commercial use due to difficulties in manufacture, maintenance and lack of dependability in operation.

It has been found that, if fuel is metered to an engine of the type herein shown specifically in accordance with the relation $$W_f = P_i N \cdot f_1 \frac{(P_c)}{(P_i)}$$

or in accordance with the relation $$W_f = P_c N \cdot f_2 \frac{(P_c)}{(P_i)}$$

where $W_f$ denotes the metered fuel flow to the engine burners, $P_i$ denotes total compressor inlet or ram pressure, N denotes engine rotational speed, $f_1$ and $f_2$ designate certain predetermined functions which may be varied as required, and $P_c$ denotes a pressure which exists at some stage of the compressor, preferably on the discharge side thereof, the engine may be accelerated so as to just avoid a compressor stall or surge.

It is, therefore, one of the principal objects of the present invention to provide a relatively simple fuel control system for gas turbine engines which will permit a substantially optimum acceleration rate throughout the entire operating range of the engine.

Another object of this invention is to provide a simplified fuel control system which meters fuel to the engine as a function of a certain engine parameter which uniquely defines the compressor stall characteristics at all engine operating conditions; i.e., to meter fuel to the engine in accordance with the relation $$W_f = P_c N \cdot f_2 \frac{(P_c)}{(P_i)}$$

Another object of this invention is to provide a simplified fuel control system which meters fuel to the engine as a function of a certain engine parameter which uniquely defines the compressor stall characteristics at all engine operating conditions; i.e., to meter fuel to the engine in accordance with the relation $$W_f = P_i N \cdot f_1 \frac{(P_c)}{(P_i)}$$

An additional object of this invention is to provide a fuel control system for engines of the type specified which meters fuel to the engine as a function of a certain engine parameter which uniquely defines the compressor stall characteristic at all engine operating conditions and which is of such inherent versatility that engines having different compressor stall characteristics may be controlled, if minor adjustments are made in the mechanism to be described, to accelerate along the compressor stall limit.

A further object of this invention is to provide a mechanism which may be easily and efficiently adapted to meet engine operating characteristics of different engines.

The foregoing and other objects and advantages will become apparent in view of the following description taken in conjunction with the drawings, wherein:

Figure 2 is a sectional view of the present invention shown removed from the main control and drawn in enlarged form;

Figures 1, 5, 6:
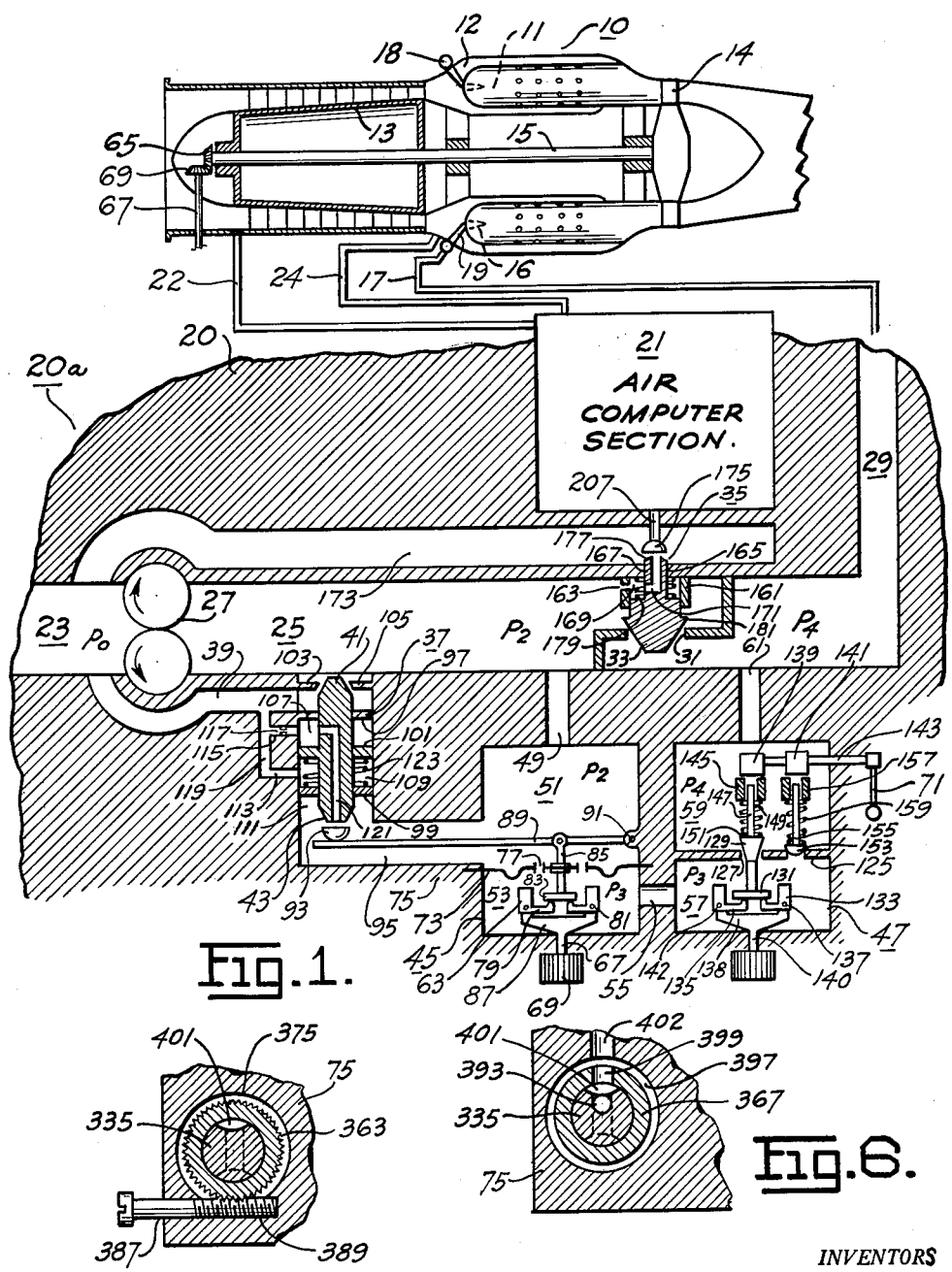
Figure 1 is a sectional view, with the parts thereof shown in elevation, of a gas turbine engine having operatively associated therewith a fuel control embodying the present invention.
Figure 5 is a cross-sectional view taken along line 5—5 in Figure 2 showing the rotary valve and the sleeve associated therewith and the means for adjusting the sleeve.
Figure 6 is a cross-sectional view of the rotary valve and sleeve taken along line 6—6 of Figure 2 showing the coacting relationship of the passages associated therewith.

Referring to Figure 1, a gas turbine engine which is generally indicated at 10 includes a series of combustion chambers 11, mounted in a casing having a header or air intake section 12. A dynamic compressor 13 of the axial flow type is shown driven by means of a turbine 14 through shaft 15; each of the combustion chambers is provided with a burner nozzle 16 to which metered fuel is supplied under pressure by way of a conduit 17, fuel manifold 18 and individual fuel lines 19. The conduit 17 receives metered fuel from a fuel control device indicated by 20 which includes the present invention shown schematically at 21 as part thereof. The air computer section 21 communicates with compressor inlet and discharge pressure through conduits 22 and 24, respectively.

Fuel enters the fuel control device 20 through an inlet conduit 23 at a pressure $P_0$, which is supplied to a main fuel conduit 25 by a pump 27, the inlet of which is connected to a supply tank, not shown. The main supply of fuel to burner nozzles 16 flows from conduit 25 to metered fuel conduit 29 by way of a main metering restriction 31 which is controlled by a main metering valve 33 to provide metered fuel at a pressure $P_4$. The main metering restriction 31 is controlled by the position of metering valve 33 which is determined by the action of the air computer 21 and servo valve 35.

Fuel may also flow through a by-pass valve unit 37 and a branch conduit 39 to the return or inlet side of pump 27 at pressure $P_0$. The position of valve member 41 of the by-pass valve 37 determines the quantity of fuel flow which will pass through the metering restriction 31 at any given position of metering valve 33. Also, the position of valve member 41, at any given engine operating condition, is controlled by the action of servo valve 43 which in turn is controlled by the speed head generator section 45 and the mechanical head governor section 47.

Another fuel flow path, which is in parallel with the main passage flow through metering restriction 31, includes a branch conduit 49, variable volume chambers 51 and 53, passage 55, chambers 57 and 59, and conduit 61. The speedhead generator section 45 includes one or more engine driven speed sensing weights 63 adapted to be suitably driven from the main engine shaft 15 of engine 10 by a gearing arrangement, such as schematically shown at 65 and a drive shaft 67 having a driven gear 69. The speed head generator section 45 operates to control the pressure drop across main metering valve 33 as a function of engine speed. The mechanical head governor section 47 functions as an all-speed governor and is adjustable to any desired selected speed within the operating range of the engine by a pilot controlled throttle lever 71.

Now more specifically describing the various units generally referred to above, of which the fuel control device 20 is comprised, the speed head generator section 45 functions to generate a fuel metering head across metering restriction 31 which varies as the square of the engine speed. The structure which comprises said speed generator section includes a diaphragm 73 attached at its outer edge to casing 75 and having fixed orifices 77 which provide for communication between oppositely disposed variable volume chambers 51 and 53. Engine speed sensing weights 63 are mounted on the outer ends of levers 79 which are fulcrumed at 81 and which impose a force on a flanged end 83 of rod 85. The speed sensing weight levers 79 are suitably mounted on a flanged extension 87 of drive shaft 67 by the fulcrum pins 81. Rod 85 extends through the center of diaphragm 77 and is securely attached thereto. The upper end of rod 85 is fixedly secured to a lever 89, one end of which is fulcrumed to casing 75 by pin 91 and the other of which is secured to a half-ball member 93. The conduit 49 communicates chamber 51 with fuel at unmetered pressure $P_2$, and a passage 95, through which lever 89 extends, communicates servo valve 43 with chamber 51.

The by-pass valve unit 37 consists of the valve member 41 reciprocably mounted in annular valve guide members 97 and 99 and having a flanged portion 101 extending from the mid portion thereof. The contoured end of the valve member 41 is adapted to engage an orifice 103 centrally located in a flanged portion 105 extending from casing 75. Variable volume chambers 107 and 109 are partially defined by flanged portion 101 which is slidably engaged with chamber 111. A passage 113 and a passage 115, the latter having a bleed 117 therein, communicate chambers 109 and 107, respectively, with a passage 119, which communicates with conduit 39. The half-ball member 93 is adapted to coact with valve 41 thereby controlling flow of fluid through a passage 121 which connects conduit 95 with chamber 107. A spring 123 is interposed between valve flange 101 and annular valve guide member 99 to maintain an engagement of valve 41 with orifice 103 until a predetermined minimum $P_2$ pressure is reached.

The mechanical head governor section 47 consists of chambers 57 and 59 oppositely disposed in relation to a partition 125 having an orifice 127 through which extends a valve 129 having a flanged portion 131 at the lower end thereof. One or more weights 133 are mounted on the outer ends of levers 135 which are fulcrumed at 137 and which impose a force against the flanged portion 131.

The speed sensing weight levers 135 are suitably mounted on a flanged extension 138 of drive shaft 140 by the fulcrum pins 142. The pilot controlled lever 71 is operatively attached to cams 139 and 141 by means of a rod 143 securely fixed thereto. Cam 139 is adapted to engage a tubular member 145 slidably receiving an extended portion 147 of valve 129. A spring 149 is interposed between tubular member 145 and a shoulder 151 formed on valve 129. A check valve 153 having a reduced diameter extension 155 slidably engaged with a tubular member 157 is adapted to be controlled by cam 141. A spring 159 is interposed between valve 153 and the tubular member 157. The passage 55 connects chambers 53 and 57 and the conduit 61 connects chamber 59 with outlet conduit 29.

The main metering valve 33 is slidably received in an annular guide member 161 having an opening 163 through the sidewall thereof. A reduced diameter portion 165 of metering valve 33 extends through an opening 167 in casing 75 and is slidably engaged therewith. A variable volume chamber 169 receives fuel at $P_2$ pressure through the opening 163 and discharges fuel through a passage 171 formed in the reduced diameter portion of metering valve 33 to a conduit 173 communicating with the inlet side of pump 27. A half-ball member 175 and a valve seat 177 formed at the discharge end of passage 171 coact to vary the pressure within chamber 169 in response to a signal from the air computer section 21. A spring 179 interposed between casing 75 and a shoulder 181 formed on metering valve 33 tends to urge the metering valve towards a closed position.

Referring now to the schematic representation of the air computer 21 of Figure 2, reference numeral 183 designates a modulated pressure unit which controls the position of metering valve 33 in orifice 31 and thus the flow of fuel to the engine in response to a compressor supplied pressure. The modulated pressure unit comprises a casing 184 having a chamber 185 which communicates with compressor discharge pressure $P_c$ through conduit 24 (see Figure 1) and conduit 187 which has a calibrated restriction 189 and a valve assembly 191 in series therewith and with compressor inlet pressure $P_1$ through a conduit 193 having a calibrated restriction 195 therein and conduit 22 (see Figure 1). The sizes of the calibrated bleeds 189 and 195 are very carefully selected so that they have a predetermined area ratio. This ratio is determined by the particular stall characteritics of the engine on which the air computer is used. The valve assembly 191 comprises an orifice 197 controlled by a manually adjustable needle valve 199. The modulated pressure chamber 185 contains an expansible evacuated bellows 201 which is sealed from its surroundings by cover plate members 203 and 205 attached thereto by any suitable means which will provide an airtight seal. Cover plate 203 is carried by an adjustable screw member 207 threadedly engaged therewith. The screw member 207 is rotatably secured in retaining member 208 threadedly engaged with casing 184. Cover plate 205 includes an extended rod portion 209 which passes through an opening 211 in casing 184. A recess 213 in the opening 211 is adapted to receive a seal 214 through which the rod 209 slides and to the free end of which the half-ball valve member 175 is fastened.

It has been found that where bleeds 189 and 195 are properly selected, modulate pressure ($P_m$) varies directly as some predetermined function of compressor pressure ratio ($P_c$)/($P_1$). The specified desired function of compressor pressure ratio for any given engine, as effectively measured by pressure $P_m$, is determined by the selected ratio of the bleed areas. The bleed areas are selected so that the velocity of the flow of air through the bleed 195 reaches sonic velocity at some predetermined compressor pressure ratio, which results in pressure $P_m$ becoming some predetermined fixed percentage of pressure $P_c$ at all compressor ratios above said predetermined ratio.

When the engine is inoperative, $P_m$ pressure is at a minimum and bellows 201 is fully extended. The metering valve 33 is forced downward by spring 179 to provide a minimum orifice 31 area and valve seat 177 assumes a fixed position in relation to the bellows actuated half-ball 175.

As modulated pressure ($P_m$) increases, as would be the case during acceleration of the engine, bellows 201 contracts thus causing rod 209 and the metering valve servo half-ball 175 to move away from valve seat 177. Movement of the half-ball 175 serves to vary the pressure within chamber 169 which acts against metering valve 31 thus controlling the effective area of orifice 31. If at any equilibrium condition of operation compressor pressure ratio changes, for example, as a result of a change in compressor inlet temperature, pressure $P_m$ effectively measures this ratio change in accordance with the aforementioned predetermined function thereof to momentarily change the length of bellows 201 which results in an actuation of metering valve 33 to a new position. It is, therefore, seen that the position of metering valve 33 defines an area at metering orifice 31 which varies directly as a function of compressor pressure ratio, and that for any given fuel pressure head across said metering orifice, a fuel flow to the burner nozzles 16 will result which is also proportional to said predetermined function of compressor ratio.

The present invention includes a pressure ratiometer unit 215 which is utilized to provide an output signal as a function of the compressor pressure ratio ($P_c$)/($P_1$) to modify the fuel flow to the engine in such a manner as to avoid entry into the stall zone when the engine is operating within its normal speed range. The unit includes an outer bellows 217 and an evacuated inner bellows 219 concentrically arranged and housed within a chamber 221 in casing 75. An upper cover plate 223 is attached to bellows 217 and 219. The lower end of bellows 219 is attached to a shoulder 225 formed on the periphery of an open ended tubular member 227 which extends upward into bellows 219 to provide lateral support therefor. A lower closed end 229 of supporting member 227 extends through an opening 231 in casing 75. A lock nut 233 threadedly engages the end 229. A lower cover plate 235 is securely attached to bellows 217 by means of an outwardly extending flange 237 formed thereon. A flanged portion 239 of member 227 engages an inwardly extending flange 241 formed on lower cover plate 235 to urge the latter against a sealing gasket 243 interposed between flange 241 and casing 75. The lock nut 233 securely retains the cover plate 235 and member 227 in their proper relationship when tightened. Passages 245, 247 and 249 formed in sealing gasket 243, lower cover plate 235 and flange 239, respectively, are adapted to register together to form a continuous passage. The latter mentioned passages are held in axial alignment by means of a locating pin 251 which engages flange 239, cover plate 235 and gasket 243 and extends into a recess 253 in casing 75. A conduit 255 connects chamber 221 with conduit 193. Located in the upper part of the chamber 221 is a valve 257 adjustably carried in a bore 259. The valve includes a body 261 which is threadedly engaged at one end with casing 75 and with a lock nut 263 which frictionally engages casing 75. The valve body is provided with a valve seat 265 which communicates with an annular recess 267 through axial bore 269 and a radial bore 271. A half-ball 273 is operatively secured adjacent to valve seat 265 by retaining member 275 removably secured to valve body 261. The half-ball 273 is positioned relative to valve seat 265 by a projection 277 centrally located on upper cover plate 223. A sealing gasket 279 is contained in each of the recesses 281 and 283 in valve body 261. The annular recess 267 receives compressor discharge pressure $P_c$ via a restriction 285 and passage 287 which communicates with conduit 187 through conduit 289. The recess 267 further communicates with a chamber 300 by a passage 293 having a restriction 295 therein. The piston 297 having a downwardly extending skirt 299 is slidably mounted in chamber 300. An elongated piston rod 301, a portion of which is contoured to form a valve element 303 and another portion of which forms a rack 305, is slidably received by valve guide 307 having a bore 309, an inner annular recessed portion 311 and an orifice 313. The valve guide 307 is removably secured in a bore 317 against a shoulder 315 in casing 75. Passages 319 are formed through the sidewall of a portion of valve guide 307 which extends upward into chamber 300. The lower section of valve guide 307 has a peripheral groove 321 which is threadedly engaged with a rotatable adjusting screw 323 axially secured in an opening 325 in casing 75. A sealing ring 327 is contained by each of the recesses 329 and 331 in valve guide 307. Valve guide 307 slidably receives piston rod 301 with the contoured portion 303 being operatively positioned in orifice 313.

The rack 305 is operatively engaged with a pinion 333 attached to a rotatable valve element 335 which is to be hereinafter described. The portion of bore 309 within which rack 305 slides is eccentrically formed to provide a means of adjusting for any undesirable backlash resulting from the rack and pinion operation. Frictional engagement between rack 305 and the eccentric bore is controlled by adjusting screw 323 which may be turned in either direction to rotate valve guide 307 as desired. Conduit 289 is connected to a branch passage 343 containing restriction 345 and communicating with the interior of bellows 217 via an annular recess 347 formed in valve guide 307, passage 349, and passages 245, 247 and 249. A passage 351 transmits pressure $P_c$ from passage 343 to a recess 353 formed in the periphery of piston 297 to establish a $P_Q-P_c$ drop across piston 297. The $P_Q-P_c$ pressure differential effects a response characteristic of piston 297 much the same as a spring preload would. A branch circuit consisting of passages 355 in the valve guide 307, orifice 313, recess 311, and passages 319 communicates annular recess 347 with that portion of chamber 300 existing beneath piston 297 and with chamber 221 through annular recess 357 and passages 359. Bore 317 is closed at its open end by a plug 361 threadedly engaged with casing 75.

The valve element 303 is controlled by the attached piston 297 which responds to the pressure drops $P_Q-P_1$ and ($P_Q-P_c$) thereacross in such a manner that the pressure ratio ($P_x$)/($P_1$) across orifice 313 is maintained at a predetermined constant value. It has been found that (see copending U.S. application Serial No. 386,362 filed November 15, 1953, in the name of Robert G. Rose and having a common assignee), with two restrictions in series, such as restriction 345 and 313, in a conduit which is vented at one end thereof to a source of variable high fluid pressure $P_c$ and at the opposite end thereof to a source of variable low fluid pressure $P_1$, control of the ratio of fluid pressures across the second series restriction 313 to a substantially constant value results in the ratio of the areas $$\frac{A_1}{A_2}$$

being equal to and variable only as a predetermined function of the ratio of the source pressures ($P_c$)/($P_1$). $A_1$ and $A_2$ designate the areas of orifices 313 and 345, respectively. This relationship may be expressed in the following form:

$$\frac{A_1}{A_2} = f_x \frac{(P_c)}{(P_i)}$$

when $$(P_x)/(P_i) = \text{a constant}$$

where $f$ denotes a predetermined functional relation. This relationship has been utilized in the design of the air computer so that the degree of displacement of piston 297 and thus valve element 303 relative to the area of orifice 313 is always a predetermined function of the compressor pressure ratio $(P_c)/(P_i)$, which function may be varied as desired by suitable contouring of valve 303.

The controlled constant pressure ratio $P_x/P_i$ is proportional to the effective area ratio of the upper and lower surfaces of cover plate 223 which are exposed to pressures $P_i$ and $P_x$, respectively. The particular desired value of pressure ratio $P_x/P_i$ for any given installation is selectable and may, for example, be varied by installing an inner bellows having a larger diameter or a smaller diameter, as desired.

If with the illustrated arrangement the governor valve 129 (see Figure 1) is manually positioned to a higher selected speed, fuel flow to the engine will immediately increase, initiating acceleration thereof, and a corresponding increase in compressor discharge pressure $P_c$ will occur at a rate which is a function of engine speed and the existent pressure and temperature conditions in the inlet section of compressor 13. During acceleration of the engine, pressure $P_x$ tends to increase, and the bellows 217 which is responsive to a change in $P_x$ or $P_i$ is caused to expand. A corresponding displacement of half-ball 273 towards valve seat 265 causes an increase in pressure $P_Q$ which moves piston 297 and valve element 303 downward to produce a large orifice 313 opening. An increase in the bleed-off of pressure $P_x$ through orifice 313 results in a decrease in pressure $P_x$ which allows a re-establishment of the correct $P_x/P_i$ across bellows 217. Likewise, an increase in pressure $P_i$ will momentarily upset the equilibrium of bellows 217, which results in a resetting of half-ball 273 and a concomitant movement of piston 297 such that a constant $P_x/P_i$ ratio is maintained. From the above, it is also apparent that a simultaneous change in pressures $P_c$ and $P_i$, in the same or opposite senses, results in an actuation and control of the half-ball 273 which causes a change in pressure $P_Q$ to reposition valve 303 such that the pressure $P_x/P_i$ is always maintained at a substantially constant and predetermined value.

The displacement of valve 303 is transmitted through rack and pinion 305 and 333 to rotary valve 335, which controls a flow of compressor discharge pressure to chamber 185 as a function of compressor pressure ratio $P_c/P_i$ to vary fuel flow to the engine in accordance with the stall characteristics of the engine. The valve element 335 is slidably carried by a series of annular shaped sleeve members 363, 365, 367, 369, 371 and 373, which are removably secured axially in a bore 375 in casing 75. A washer shaped member 377 is interposed between adjacent sleeve members and between sleeve member 373 and a spacing member 378 which engages a shoulder 380 formed by a reduced diameter portion of bore 375. A sealing ring 381 is contained in a recess 383 on each of the sleeve members and on spacing member 378. A peripheral groove 385 on each of the sleeve members is threadedly engaged with an associated screw member 387 secured axially in an aperture 389 in casing 75 (see Figure 5). The valve element 335 is provided with three parallel passages 391, 393 and 395 which form a portion of circuits A, B and C, respectively. Each of the sleeves 363, 365, 367, 369, 371 and 373 are rotatable by means of the associated screw member 387 and are individually adjusted when the control is calibrated for the desired port opening and closing timing sequence. During operation of the engine, the sleeves are fixed in position. Each of the aforementioned sleeve members has an annular recess 397 formed on the outer surface thereof which communicates with a passage or timing port 399 which in turn registers with a notch or milled depression 401 formed at each end of its associated passage 391, 393 or 395 in valve element 335. The annular recesses 397 in sleeve members 363, 367 and 371 are adapted to register continuously with inlet passages 400, 402 and 403, respectively, in casing 75. The annular recesses 397 in sleeve members 365, 369 and 373 are adapted to register continuously with outlet passages 405, 407 and 409, respectively. Each of the ports 400, 402 and 403 communicate with a bore 411 having a removable valve assembly 413 threadedly engaged therein. The valve assembly comprises an adjustable detent type needle valve 415 having an orifice 417 at the lower end thereof. A conduit 419 communicates passage 187 with the portion of chamber 300 below piston 297 through passage 423 having a plug 425 therein and annular recess 357. Branch passages 427, 429 and 431 communicate conduit 419 with inlet passages 400, 402 and 403, respectively, through a restriction 433, an annular recess 435 and a passage 437 in receptacle 417. The conduit 419 is adapted to receive the plug 425 at any one of the locations 441, 443 or 445, depending upon the circuitry desired. The plug 425 shown in Figure 2 is in position to allow compressor discharge pressure $P_c$ to flow to each of the branch passages 427, 429 and 431. Outlet ports 405, 407 and 409 are connected by a passage 447 which communicates with the modulated pressure $P_m$ chamber 185 via passage 449. The passage 447 is adapted to receive a plug 451 (see Figure 4) at locations 453 and 455 to provide for alternate venting arrangements. Passages 457 and 459 are extensions of outlet ports 405 and 409, respectively, and are adapted to threadedly receive an associated plug 461 or bleed 462 (see Figure 4). A blind bore 463 in valve element 335 slidably receives a spring 465 and a rod 467, one end of which extends therefrom to engage casing 75. The valve element 335 is carried by a bearing, which may be of any suitable type such as the ball and race bearing 469 shown and being removably secured within a portion of a stepped bore 471 in a plug 473 which is threadedly engaged with casing 75. An adjustable detent type screw member 475 is threadedly engaged in the bore 471 of plug 473 and extends inwardly to engage the end of valve element 335. A sealing ring 477 is contained in a recessed portion 479 of screw member 475. A cap 483 is threadedly engaged with an extended portion of plug 473.

Figure 9:
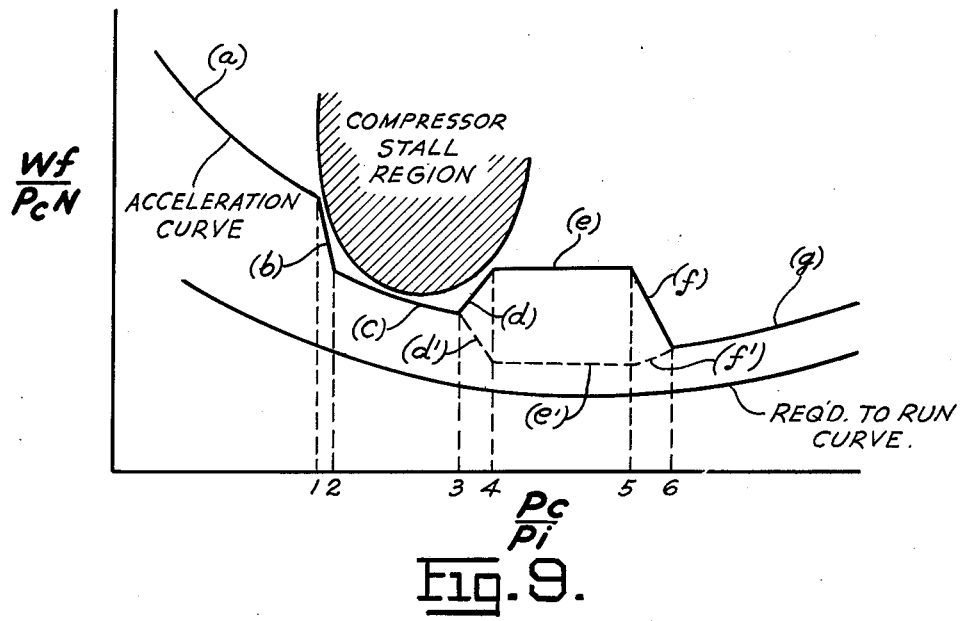
Figure 9 shows a series of curves having a $W_f/P_cN$ vs. $P_c/P_i$ relationship and the effect thereon of the air computer section to avoid compressor stall.
Figure 8:
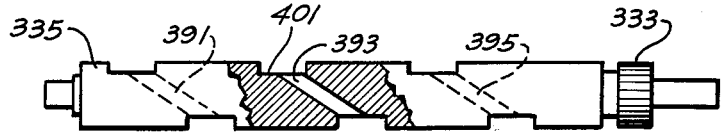
Figure 8 is a view of the rotary valve taken at a right angle to Figure 7 with the front center section shown broken away.
Figure 7:
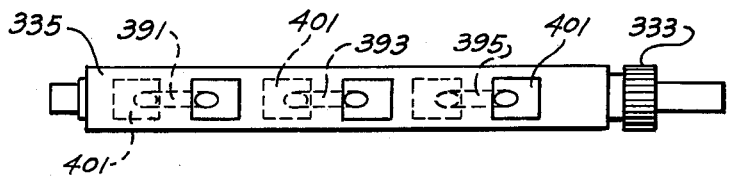
Figure 7 is a plan view of the rotary valve of Figure 2 showing the arrangement of passages therethrough.

The maximum engine speed fuel requirement will vary as a result of engine inlet air temperature changes. This change in fuel requirement is not completely proportional to the compressor discharge pressure signal from the engine and the additional fuel schedule modification needed to prevent speed changes with the proportional type governor used is effected through a selective positioning of valve element 335 along its axis. The axial adjustment of valve 335 which positions notch 401 relative to timing port 399 is provided for by the adjustment screw 475 and will cause an increase or decrease, as desired, in the effective area of circuit A. A movement of valve element 335 towards the left produces a decreasing slope characteristic and a movement towards the right produces an increasing slope characteristic in the portion $g$ of the acceleration curve of Figure 9. This selective adjustment in the slope of the curve will thus permit the maintenance of a constant percentage spread between the acceleration curve and the required-to-run curve throughout the latter portion of the speed range. The above mentioned adjustment has little or no effect on the effective area of the timing ports of circuits B and C, due to the relative amounts of area exposed.

The passages 457 and 459 which form extensions of outlet ports 405 and 409, respectively, may be connected to other circuits of the fuel metering control to provide an actuation of some member in response to compressor discharge pressure or compressor inlet pressure $P_1$ as a function of the aforementioned compressor pressure ratio $P_c/P_1$. In such a case, plug 461 would be removed as required and plug 451 (see Figure 4) would be installed in one or both of the threaded locations 453 and 455 to isolate the outlet portion of the circuit or the circuits involved from the modulated pressure $P_m$ circuit.

The needle valve 415 and bleed 433 in each of the circuits A, B and C function to control the flow of fluid through each circuit when the inlet and outlet ports are at a maximum area opening. The needle valve 415 may be adjusted for independent calibration of its associated circuit when the inlet and outlet timing ports 399 are fully registered with their associated notch or milled depression 401 in valve element 335. The fixed bleed 433 provides sensitivity and range adjustment means for needle valve 415.

It is to be assumed that the engine is operating at an idle throttle setting at sea level conditions.

Referring to Figure 1, the cams 139 and 141 are operatively positioned by the setting of the pilot's lever 71 to an idle position. The action of these cams preload their associated springs to a predetermined force acting on the respective valves. The spring 147 force is balanced by an equal governor weight 133 force and governor valve 129 establishes a definite orifice 127 area across which a constant $P_3-P_4$ differential proportional to engine speed squared, is maintained. The check valve 153 provides further control of the $P_3-P_4$ differential by opening if the $P_3-P_4$ differential should reach a prescribed limiting value. The $P_2-P_3$ differential across diaphragm 73 is balanced by an equal and opposite generator weight 63 force which results in a definite position of half-ball member 93 with respect to valve seat 43. The flow of fluid through passage 121 to chamber 107 will effect a downward shift of by-pass valve 41 thus returning to the pump inlet that amount of fuel which is in excess of the amount needed to maintain the required $P_2-P_4$ differential across metering valve orifice 31. The orifice 31 area is established by metering valve 33 which is maintained in a balanced condition for any given throttle setting by a plurality of forces acting thereon. The effective area of metering valve 33 upon which $P_2$ pressure acts produces a resultant upward acting force which force is balanced by an equal downward acting force due to the combined forces of spring 179 and the servo valve 35 controlled pressure in chamber 169 acting against its effective metering valve area. Assuming a constant air density, the air computer section 21 operatively positions the half-ball 175 which coacts with valve seat 177 to establish the above mentioned chamber 169 pressure and thus the orifice 31 area as a function of compressor pressure ratio $(P_c)/(P_1)$.

Referring to Figure 2, compressor discharge pressure is transmitted through conduit 24 (see Figure 1) and the circuit which includes passage 289, passage 343, annular recess 347, and passage 349, to the interior of bellows 217 at a controlled pressure $P_x$. Compressor discharge pressure $(P_c)$ also flows through passage 187, valve 191, and bleed 189 to chamber 185, thence through passage 193, bleed 195, and conduit 22 (see Figure 1) to the compressor inlet pressure source. Compressor inlet pressure $(P_1)$ is communicated to the exterior of bellows 217 through passage 193, passage 255, and chamber 221. A predetermined constant pressure ratio $P_x/P_1$ is maintained across cover plate 223 and orifice 313 by means of piston 297 which responds to the servo valve 257 controlled pressure $(P_Q)$ to position valve 303 in orifice 313 thereby establishing a particular orifice 313 area. The orifice 313 area controls the pressure $P_x$ level by bleeding compressor discharge pressure $(P_c)$ from annular recess 317 through passages 355 to recess 311, from which it flows through passages 319 to chamber 300 at pressure $P_1$. A definite orifice 313 area will exist, for any given compressor pressure ratio $P_c/P_1$, such that the predetermined constant pressure ratio $P_x/P_1$ across orifice 313 and cover plate 223 will be maintained. The degree of displacement of valve 303 is transmitted through rack 305 to valve element 335 which is rotated to a position whereby inlet timing port 399 in sleeve 367 and outlet timing port 399 in sleeve 369 are each registering with an associated recess 401 in valve element 335. The effective area thus provided allows a flow of compressor discharge pressure $(P_c)$ through circuit B to outlet port 407 from which it flows via passage 449 to chamber 185. The chamber 185 pressure exists as a result of the $(P_c)$ flow through the circuit containing series bleeds 189 and 195 and the $P_c$ flow through circuit B. The introduction of $P_c$ flow through circuit B into chamber 185 effects an increase in modulated pressure $(P_m)$ over that obtained by the circuit having series bleeds 189 and 195 alone. The modulated pressure $(P_m)$ acts upon bellows 201 which in turn causes a displacement of half-ball 175 to provide a definite metering valve position and a metering valve orifice area across which the required $P_2-P_4$ differential will be maintained. The rate of fuel flow delivered to the engine through outlet conduit 29 will thus be a function of engine speed, engine inlet air density and compressor pressure ratio $(P_c)/(P_1)$ and the engine will operate at a steady idle speed.

To accelerate the engine to maximum speed, the throttle lever 71 is manually actuated to a position corresponding to the desired speed. The subsequent increase in spring 147 force displaces governor valve 129 against the existing force of governor weights 133 to produce a minimum orifice 127 opening which results in a maximum $P_3-P_4$ differential across governor valve 129. The check valve 153 is reset by cam 141 to provide a different limiting value to the $P_3-P_4$ differential thereacross. A decrease in the $P_2-P_3$ differential across diaphragm 73 occurs as a result of an increase in $P_3$ pressure which, in addition to the existing speed generator weight force, causes an upward displacement of said diaphragm and a concomitant repositioning of half-ball 93 with respect to valve seat 43 such as to decrease the flow through passage 121. The subsequent reduction in pressure in chamber 107 allows the by-pass valve 43 to move towards orifice 103. A lesser amount of fuel will be allowed to flow back to the pump inlet and the $P_2$ pressure upstream of valve 33 will increase causing a greater $P_2-P_4$ differential across valve 33. The engine will then begin to accelerate as a result of the increased fuel flow. As engine speed increases compressor discharge pressure $P_c$ also increases and causes a subsequent unbalancing of the $(P_x)/(P_1)$ pressure ratio across cover plate 223. Pressure $P_x$ will increase and cause bellows 217 to expand thus displacing half-ball 273 towards valve seat 265. The compressor discharge pressure $P_c$ which is transmitted to chamber 300 through conduits 289 and 287, valve recess 267, and conduit 293, will be bled off through passage 269 at a lesser rate, thereby producing a rise in pressure $P_Q$. As piston 297 moves downward valve element 303 is repositioned such that the change in orifice 313 area causes a greater bleed-off of pressure $P_x$ therethrough to compressor inlet pressure $P_1$. The predetermined pressure ratio $(P_x)/(P_1)$ across cover plate 223 will be re-established and piston 297 will remain in position until $(P_x)/(P_1)$ is again unbalanced. Since the compressor pressure ratio $(P_c)/(P_1)$ is continuously increasing as the engine accelerates, the action of valve 303 is essentially that of constant movement in order to provide the proper orifice 313 area and thus maintain the ratio $(P_x)/(P_1)$ constant. Since the valve element 335 is rotated by rack 305 in response to movement of valve 303, the relationship of inlet timing port 399 in sleeve 367 and outlet timing port 399 in sleeve 369 to their associated recesses 401 will be changing constantly also. The adjustment of each of the sleeves 367 and 369 is such that a flow of $P_c$ will be maintained through circuit B to chamber 185 during this period. Modulated pressure $P_m$ increases and causes a contraction of bellows 201 thereby modifying the action of metering valve 33 and causing a change in fuel flow such that the engine accelerates along portion $a$ of the acceleration curve of Figure 9. During the acceleration of the engine along this portion of the curve, the circuits A and C remain closed. At point 1, the increasing compressor pressure ratio $(P_c)/(P_i)$ has caused valve element 335 to rotate to a position whereby the effective area of circuit B which is created by the cooperating relationship of recess 401 and outlet timing port 399 starts to decrease. As the effective area of circuit B decreases, a subsequent decrease in modulated pressure $P_m$ in chamber 185 occurs until at point 2, there is no flow through circuit B. This action results in a downward trend of the curve as shown at $b$ in Figure 9 to avoid the compressor stall area. At point 2, circuits A, B and C are closed and the $P_m$ in chamber 185 is a function of the $P_c$ flow through the series bleeds, 189 and 195, circuit only. The engine will now accelerate along portion $c$ of the acceleration curve. During this time, the valve element 335 will continue to rotate in response to movement of valve 303 which continues to function in the aforementioned manner to maintain a constant $P_x/P_i$ ratio. The relative positions of the inlet and outlet ports 399 in the sleeves of circuits A, B, and C, with respect to their associated recesses 401 in valve element 335 is such that a $P_c$ flow cannot exist therethrough during the acceleration of the engine from point 2 to point 3 on the portion $c$ of the curve. At point 3, the valve element has been caused to rotate to a position whereby the recess 401 at one end of passage 395 will begin to register with the inlet timing port 399 in sleeve 371 and the recess 401 at the opposite end of passage 395 will be contiguous to outlet timing port 399 in sleeve 373 of circuit C. Circuits A and B continue to remain closed to $P_c$ flow, and circuit C begins to transmit $P_c$ pressure to the modulated pressure chamber 185. The flow through circuit C is additive to that through series bleeds 189 and 195 and a rise in modulated pressure $P_m$ occurs. The increase in pressure $P_m$ produces a contraction of bellows 201 which effects a movement of rod 209 and half-ball 175 (see Figure 1) away from valve seat 177. The pressure in chamber 169 decreases and metering valve 33 is forced upward by pressure $P_2$ until the valve seat 177 coacts with half-ball 175 such that the pressure in chamber 169 will again balance the metering valve. The greater orifice 31 area thus established by metering valve 33 will provide for an increase in fuel flow to the engine which having skirted the stall region will safely tolerate the added fuel flow. The registration of recess 401 with inlet timing port 399 in sleeve 371 becomes more pronounced as valve element 335 continues to rotate causing a progressive increase in $P_c$ flow through circuit C and a subsequent progressive increase in modulated pressure $P_m$ in chamber 185. The engine will now accelerate along portion $d$ of the acceleration curve. At point 4, the inlet timing port 399 area and the outlet timing port 399 area are each at a maximum and the needle valve 415 in circuit C assumes control of the $P_c$ flow therethrough. The engine continues to accelerate and follows the portion $e$ of the curve. At point 5, the outlet timing port 399 area begins to decrease due to rotation of valve element 335 resulting in a decrease in modulated pressure $P_m$. The decrease in pressure $P_m$ allows bellows 201 to expand and actuate half-ball 175 toward valve seat 177 (see Figure 1) causing an increase in chamber 169 pressure which in turn causes metering valve 33 to move downward until the chamber 169 pressure is adjusted to rebalance the metering valve 33. The decrease in orifice 31 area effects an increase in the $P_2$—$P_4$ drop thereacross and a decrease in fuel flow to the engine. As the outlet timing port 399 area in sleeve 373 continues to decrease, the engine will accelerate along portion $f$ of the acceleration curve. At point 6, valve element 335 is rotated to a position whereby the recess 401 in valve element 335 ceases to register with outlet timing port 399 in sleeve 373 and circuit C is closed. The adjustments of sleeves 363 and 365 are such that, at point 6, the inlet timing port 399 in sleeve 363 and the outlet timing port 399 in sleeve 365 will begin to register with their associated recesses 401 and circuit A will transmit $P_c$ pressure to the modulated pressure chamber 185. Circuits B and C are arranged to remain closed during the time that circuit A is open. As compressor pressure ratio $(P_c)/(P_i)$ continues to increase, valve 303 is subsequently displaced to maintain the constant $P_x/P_i$. The valve element 335 will continue to rotate during which time the effective area of circuit A increases as timing ports 399 in sleeves 363 and 365, respectively, become more fully registered with their associated recess 401 in valve element 335. The engine will accelerate along portion $g$ of the acceleration curve in accordance with the maximum allowable temperatures which govern fuel flows over this portion of the curve. The upper limit of the acceleration is established by means of a compressor discharge pressure limiting device, not shown. As the engine approaches maximum speed, the governor valve 129 functions to maintain the engine at that speed. Since the compressor pressure ratio $(P_c)/(P_i)$ may be assumed to remain substantially constant for any given set of conditions at maximum speed, valve 303 and valve element 335 will remain fixed in position.

Figure 3:
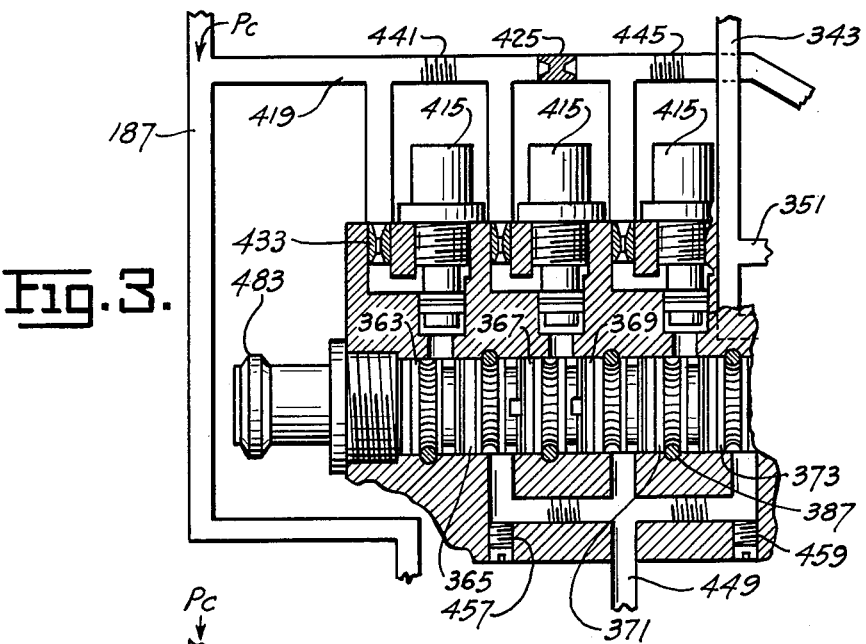
Figures 3 and 4 are sectional views of the rotary valve portion of Figure 2 showing alternate methods of venting the passages associated therewith.

Figure 3 shows an alternate arrangement of the plug 425 whereby the passage 431 is vented to compressor inlet pressure $P_i$. As heretofore mentioned, different engines may have varying engine characteristics such that an entirely different compressor stall characteristic is encountered. Referring to Figure 3, the opening and closing timing sequence of inlet and outlet timing ports 399 is identical to that described in connection with the operation of Figure 2. The engine will be made to accelerate along the acceleration curve up to point 3 at which point the inlet and outlet port 399 opening sequence will present the start of a controlled flow of modulated pressure $P_m$ from chamber 185, through passages 447 and 449, thence through circuit C to passages 431 and 423 to chamber 299 at pressure $P_i$. As the engine accelerates beyond this point, the effective area of circuit C increases due to the progressively greater registration of inlet and outlet ports 399 with their respective recesses 401 in valve element 335 in response to rotation of said valve element. The engine will accelerate along the dashed line portion $d'$ as the effective area of circuit C increases until point 4 is reached, at which time the area of circuit C is at a maximum and the needle valve 415 assumes control of the $P_m$ flow therethrough. A maximum outflow of $P_m$ from chamber 185 to $P_i$ through circuit C will now exist and three $P_m$ pressure in chamber 185 will be a function of the $P_c$ flow through the series bleed 189 and 195 circuit, although at a lower value than in the case of Figure 2, previously mentioned. The bellows 201 is affected by the modification of $P_m$ pressure in chamber 185 and, through the subsequent repositioning of half-ball 175 with relation to valve seat 177, causes metering valve 33 to vary the orifice 31 area in the manner previously described in connection with Figure 2. The quantity of fuel flow delivered to the engine will be such that the engine will accelerate along the dashed line portion $e'$ of the curve of Figure 9. At point 5, the effective area of circuit C begins to decrease as valve element 335 continues to rotate, thus decreasing the amount of registry between recess 401 and outlet timing port 399 in sleeve 373. The $P_m$ pressure in chamber 185 is caused to increase during which time the engine accelerates along the dashed line portion $f'$, until point 6 is reached. At point 6, circuit C is closed and circuit A begins to open in the manner described previously in connection with Figure 2. The engine will accelerate the maximum speed along portion g of the curve.

Figure 4:
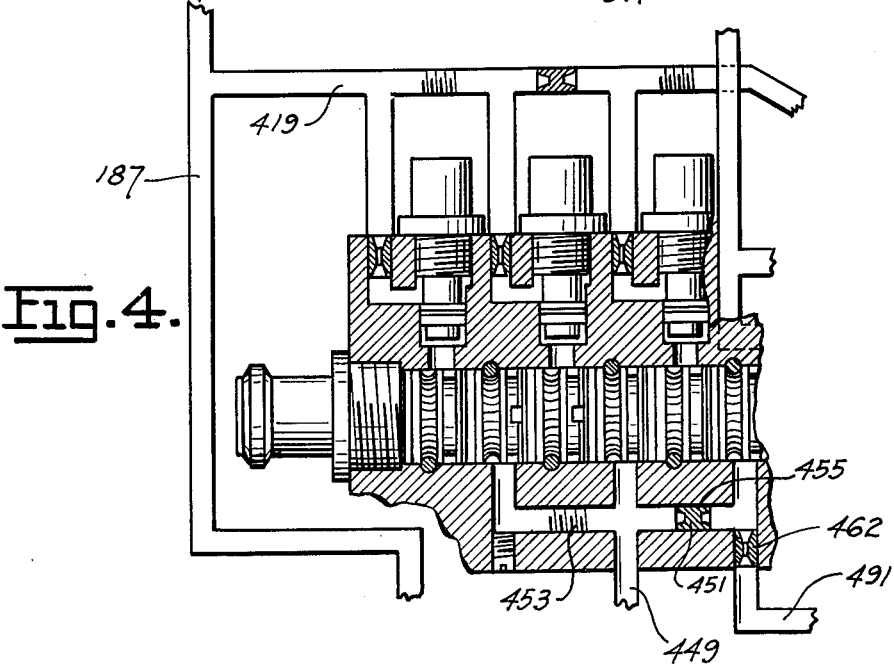

Figure 4 shows an alternate venting arrangement whereby circuits A and B function in the manner heretofore described, while circuit C is vented through its inlet to compressor inlet pressure ($P_1$) and through its outlet to a conduit 491 which communicates with some component device, not shown, in the main fuel control circuit. This component device may include a member which has an operable connection with the metering valve 33 and which, in response to ($P_1$) pressure, may effect further modification of the fuel flow to the engine. A bleed 462 replaces the plug 461 of Figure 2. As shown, circuit C is arranged to control the flow of compressor inlet pressure ($P_1$) as a function of compressor pressure ratio $(P_c)/(P_1)$ to said component device whereby an adidtional modification of the fuel flow to the engine may be effected as a function of the compressor inlet pressure ($P_1$). For example, the component device may be responsive to a ram pressure ratio $(P_1)/(P_a)$ wherein ($P_1$) designates total compresor inlet or ram pressure and ($P_a$) designates atmospheric pressure. The compressor inlet or ram pressure to the component device would, in such a case, be controlled by circuit C as a function of compressor pressure ratio $(P_c)/(P_1)$.

Although only one embodiment of the invention has been illustrated and described, it will be apparent to persons skilled in the art that various changes in form and relative arrangement of parts may be made to suit requirements.

We claim:

1. In a fuel control for gas turbine engines having a burner and a compressor, means for metering fuel to the burner comprising a fuel valve for controlling fuel to the burner, a chamber, means for continuously supplying a modulated fluid pressure to said chamber which varies as a predetermined function of engine power output over the operating range of the engine, means responsive to the fluid pressure in said chamber operably connected to said fuel valve for controlling the operation thereof, means for measuring the compressor pressure ratio, a plurality of passages connecting a source of fluid pressure with said chamber, and valve means disposed in said passages for controlling flow therethrough, said valve means being operably connected to said compressor pressure ratio measuring means and actuated as a function of compressor pressure ratio, said valve means having a different position for each compressor pressure ratio and being operative to vary the effective flow area of each of said passages over a different range of compressor pressure ratios to thereby provide a controlled modification of said modulated fluid pressure at predetermined compressor pressure ratios during acceleration of the engine.

2. In a fuel control system for a gas turbine engine having a burner and a compressor, means for metering fuel to the burner comprising a fuel metering restriction, a valve for controlling said restriction, a pressure chamber having connections to a source of compressor discharge pressure and a source of compressor inlet pressure, means operatively connected to said valve and subject to the pressure in said chamber, means for modulating the pressure in said chamber including restrictions in said connections, a conduit connected between said chamber and said source of compressor discharge pressure and being in parallel flow relationship with one of said connections, first and second orifices in said conduit in series flow relationship, a valve member arranged for varying the effective flow area of said first and second orifices, and compressor pressure ratio measuring means operably connected to said valve member to position the latter as a function of the ratio of said compressor discharge pressure to said compressor inlet pressure.

3. In a fuel control system for a combustion engine having a burner, the combination of a fuel conduit connected to deliver fuel to the burner; valve means in said conduit for controlling fuel flow therethrough; a chamber; pressure responsive means disposed in said chamber, said pressure responsive means being operatively connected to said valve means for controlling the operation thereof; means for continuously supplying a modulated fluid pressure which varies as a function of engine power output to said chamber; a relatively low fluid pressure; a relatively high fluid pressure which varies as a function of engine power output; means for measuring the ratio of said relatively high and low fluid pressure; a plurality of passages connecting said relatively high fluid pressure with said chamber; a passage connecting said relatively low fluid pressure with said chamber; valve means in flow controlling relationship with said plurality of passages and said passage, said valve means being actuated progressively by said pressure ratio measuring means to establish and disestablish flow through said plurality of passages and said passage in predetermined sequential order to thereby effect a controlled increase or decrease in said modulated pressure over selected portions of the operating range of the engine.

4. In a fuel control system for a combustion engine having a burner and a characteristic range of unstable operation, the combination of a fuel conduit connected to deliver fuel to the burner; valve means in said fuel conduit for controlling fuel flow therethrough; means responsive to a control fluid pressure derived from a fluid pressure generated by said engine operatively connected to said valve means for controlling the operation thereof; first means including a pair of restrictions in flow controlling relationship with said fluid pressure for continuously modulating said control fluid pressure to provide a fuel flow schedule in response to which said engine is accelerated around said characteristic range of unstable operation with a margin of safe operation which is relatively small over one portion of the operating range of the engine and relatively large over another portion of the operating range of the engine; and second means in flow controlling relationship with said fluid pressure for further modulating said control fluid pressure over said other portion of the operating range of the engine to provide a modified fuel flow schedule whereby said engine is accelerated around said characteristic range of operation with a substantially constant relatively small safe margin of operation, said second means including a valve member in parallel with one of said restrictions and compressor pressure ratio measuring means for actuating said valve member as a function of the compressor pressure ratio to cause an increase in said control fluid pressure at certain predetermined values of said compressor pressure ratio.

5. In a fuel control system for a combustion engine having a burner and an air compressor, the combination of a fuel conduit connected to deliver fuel to the burner; valve means in said fuel conduit for controlling fuel flow therethrough; a conduit connected between a source of compressor inlet pressure and a source of compressor discharge pressure; first and second restrictions arranged in series flow relationship in said conduit, said first and second restrictions having a predetermined fixed flow area ratio whereby a control air pressure is developed intermediate said restrictions which varies as a predetermined function of the ratio of pressures at said sources; means responsive to said control air pressure operatively connected to said valve means for controlling the operation thereof; valvular means in said conduit in parallel flow relationship with one of said first and second restrictions for controlling flow through said conduit to cause modification in said control air pressure; and means responsive to the ratio of pressures between said sources operatively connected to said valvular means for actuating the same to an open position at a first predetermined pressure ratio and a closed position at a second predetermined pressure ratio.

6. In a fuel control system for a combustion engine having a burner and an air compressor, the combination of a fuel conduit connected to deliver fuel to the burner; valve means in said fuel conduit for controlling fuel flow therethrough; a conduit connected between a source of relatively low air pressure and a source of relatively high air pressure, said relatively high air pressure varying as a function of engine power output; flow controlling means in said conduit for controlling air flow therethrough whereby a control air pressure is developed which varies as a function of engine power output; and means responsive to said control air pressure operatively connected to said valve means for controlling the operation thereof; said flow controlling means including first, second and third air passages arranged in parallel flow relationship; first and second rotatable sleeve members in each of said first, second and third air passages, said first and second sleeve members being axially spaced along a common axis and having first and second ports, respectively, radially formed therein; a rotatable valve member concentric with and carried by said first and second sleeve members, said rotatable valve member having first, second and third air channels formed therein in parallel flow relationship; said first, second and third air channels being in series flow relationship with the corresponding first and second ports in said first, second and third air passages, respectively, said first port communicating with one end of its associated air channel and said second port communicating with the opposite end of said associated channel; compressor pressure ratio measuring means operatively connected to said rotatable valve member for rotating said valve member as a function of the compressor pressure ratio; and means operatively connected to each of said first and second sleeve members for rotating said first and second sleeve members independently of one another whereby flow through said first, second and third air passages may be established and disestablished in accordance with a predetermined timed sequence of operating.

7. A fluid flow controlling device operable with a source of pressurized fluid and a fluid pressure responsive member, comprising a casing having a bore, said bore having an axis; first, second and third inlet passages in parallel flow relationship connected between said source of pressurized fluid and said bore; first, second and third outlet passages connected between said fluid pressure responsive member and said bore; a rotatable valve member disposed in said bore, said rotatable valve member being provided with first, second and third passages formed therein in parallel flow relationship, said first, second and third passages being in series flow relationship with said first, second and third inlet and outlet passages, respectively; first and second rotatable sleeve members associated with each of said first, second and third passages in said rotatable valve member for controlling the effective flow area thereof; said first and second rotatable sleeve members having fixed operating positions normally and being provided with an inlet port and an outlet port, respectively, which coact with opposite ends of their associated first, second or third passages over a predetermined range of positions of said rotatable valve member; means responsive to a variable input signal operatively connected to said valve member for rotating said valve member as a function of said variable input signal; and adjustable means for rotating said first and second sleeve members independently of one another whereby the inlet and outlet ports may be positioned relative to their respective first, second or third passages for a given position of said rotatable valve member.

8. A fluid flow controlling device operable with a source of pressurized fluid and a fluid pressure responsive member, comprising a casing have a bore, said bore having an axis; a first passage connected between said bore and said source of pressurized fluid; a second passage connected between said bore and said fluid pressure responsive member; first and second rotatable sleeve members disposed in said bore along said axis; said first and second sleeve members having an inlet port and an outlet port, respectively, radially formed therein; said first and second rotatable sleeve members having annular flow passages formed therein whereby said inlet and outlet ports are maintained in constant communication with said first and second passages, respectively; a rotatable valve member concentric with and rotatably carried by first and second sleeve members, a passage formed in said valve member, said inlet port being arranged to register with one end of said passage and said outlet port being arranged to register with the opposite end of said passage to establish communication between said first and second passages, and means threadedly engaged with said first and second sleeve member for rotatably adjusting the position of either said first sleeve member or said second sleeve member independently of the other.

9. In a fuel control system for a combustion engine having a burner and an air compressor, the combination of a fuel conduit connected to deliver fuel to the burner; valve means in said fuel conduit for controlling fuel flow therethrough; a conduit connected between a source of compressor inlet pressure and a source of compressor discharge pressure; a first restriction and a second restriction downstream from said first restriction in said conduit whereby a control air pressure is developed which varies as a predetermined function of the ratio of pressures at said sources; a passage in said conduit in parallel flow relationship with said first restriction, and valve means in said passage for controlling air flow therethrough to cause a corresponding modification in said control air pressure, said valve means including first and second rotatable sleeve members having an inlet port and an outlet port, respectively; a rotatable valve member concentric with and rotatably carried by said first and second sleeve members; a passage formed in said valve member through which said inlet port is communicated with said outlet port; said inlet port being arranged to register with one end of said last named passage and said outlet port being arranged to register with the opposite end of said last named passage; means for measuring the pressure ratio at said sources operatively connected to said rotatable valve member for actuating said valve member as a function of said compressor pressure ratio; and means operatively connected to said first and second sleeve member for rotatably adjusting said first and second sleeve members independently of one another to thereby adjust the position of said inlet port with respect to said one of said passages and/or the position of said outlet port with respect to said opposite end of said passage.

10. In a fuel control system for a combustion engine having a burner and an air compressor, the combination of a fuel conduit connected to deliver fuel to the burner; valve means in said conduit for controlling fuel flow therethrough; a conduit connected between a source of compressor inlet and a source of discharge air pressure; a first restriction in said conduit, a second restriction in said conduit in series flow relationship with said first restriction, said first and second restrictions having a predetermined fixed flow area ratio whereby a control air pressure is developed intermediate said restrictions which varies as a predetermined function of the pressure ratio between said compressor inlet and discharge air pressure sources; means responsive to said control air pressure operatively connected to said valve means for controlling the operation thereof; means defining a plurality of flow passages in said conduit in parallel flow relationship with one of said restrictions; valvular means operatively connected to said plurality of passages for controlling the air flow therethrough to cause a modification of said control air pressure; and means for measuring the ratio of pressures at said compressor discharge and inlet air pressure sources operatively connected to said valvular means for controlling the operation thereof, said valvular means being actuated progressively to cause a modification of said control air pressure over a predetermined range of pressure ratio values during an acceleration of the engine.

11. In a fuel control system for a combustion engine having a burner and an air compressor, the combination of a fuel conduit connected to deliver fuel to the burner; valve means in said fuel conduit for controlling the fuel flow therethrough; a conduit connected between a source of relatively low air pressure and a source of relatively high air pressure which varies in accordance with engine power output; flow controlling means in said conduit for controlling air flow therethrough whereby a control air pressure is developed which varies as a function of engine power output; and means responsive to said control air pressure operatively connected to said valve means for controlling the operation thereof; said flow controlling means including first, second and third air flow passages arranged in parallel flow relationship; first and second rotatable sleeve members in each of said first, second and third passages; said first and second sleeve members having an inlet port and an outlet port, respectively, radially formed therein; a rotatable valve member concentric with and carried by said first and second sleeve members, said rotatable valve member having first, second and third flow channels formed therein in parallel flow relationship; said first, second and third flow channels each having one end which registers with the inlet port and an opposite end which registers with the outlet port in each of said first, second and third air passages to control the effective flow area thereof; compressor pressure ratio measuring means operatively connected to said rotatable valve member for rotating said valve member as a function of the compressor pressure ratio, and means operatively connected to each of said first and second sleeves for rotatably adjusting said first and second sleeve members independently of one another.

12. In a fuel control system for gas turbine engines having a burner and a compressor, means for metering fuel to the burner comprising a fuel valve for controlling fuel to the burner, a chamber, means for continuously supplying a modulated fluid pressure to said chamber which varies as a predetermined function of engine power output over the operating range of the engine, means responsive to the fluid pressure in said chamber operatively connected to said fuel valve for controlling the operation thereof, a conduit connected between a fluid pressure source and said chamber, means for automatically measuring the compressor pressure ratio, and valve means operatively connected to said conduit and actuated by said pressure ratio measuring means for controlling the effective flow area of said conduit, said valve means being actuated to an open position at a first predetermined compressor pressure ratio and to a closed position at a second predetermined compressor pressure ratio to thereby effect a further modulation of said fluid pressure over a predetermined portion of the operating range of the engine.

13. In a fuel control system for a gas turbine engine having a burner and a compressor, means for metering fuel to the burner comprising a metering restriction, valve means for controlling said restriction, pressure responsive means operatively connected to said valve means for controlling the operation thereof, a conduit including a plurality of passages in parallel flow relationship communicating said pressure responsive means with a compressor generated air pressure, compressor pressure ratio measuring means, valve means operatively connected to said pressure ratio measuring means and said plurality of passages for controlling the effective flow area of said passages as a function of compressor pressure ratio, said valve means being operative to open each of said passages at a different compressor pressure ratio and close each of said passages at a different compressor pressure ratio.

14. In a fuel control as claimed in claim 1 wherein said valve means is operatively combined with said plurality of passages in such a way that each of such passages is opened at a different compressor pressure ratio and closed at a different compressor pressure ratio.

References Cited in the file of this patent

UNITED STATES PATENTS

| | | |
|---|---|---|
| 2,641,105 | Drake | June 9, 1953 |
| 2,643,514 | Jubb | June 30, 1953 |
| 2,667,743 | Lee | Feb. 2, 1954 |
| 2,670,599 | Davies et al. | Mar. 2, 1954 |
| 2,757,511 | Jagger | Aug. 7, 1956 |
| 2,818,703 | Victor | Jan. 7, 1958 |
| 2,864,393 | Drake | Dec. 16, 1958 |

FOREIGN PATENTS

| | | |
|---|---|---|
| 160,145 | Australia | Dec. 7, 1954 |
| 162,706 | Australia | May 4, 1955 |

UNITED STATES PATENT OFFICE
CERTIFICATE OF CORRECTION

Patent No. 2,979,895　　　　　　　　　　　　April 18, 1961

Elmer A. Haase et al.

It is hereby certified that error appears in the above numbered patent requiring correction and that the said Letters Patent should read as corrected below.

Column 7, line 38, for "large" read -- larger --; column 12, line 58, for "three" read -- the --; column 13, line 23, for "compresor" read -- compressor --.

Signed and sealed this 24th day of October 1961.

(SEAL)
Attest:

ERNEST W. SWIDER
Attesting Officer

DAVID L. LADD
Commissioner of Patents